Jan. 4, 1927.

F. B. COCKBURN 1,613,161

TAILSTOCK WITH TOOL SLIDE

Filed May 8, 1925   5 Sheets-Sheet 1

Jan. 4, 1927. 1,613,161
F. B. COCKBURN
TAILSTOCK WITH TOOL SLIDE
Filed May 8, 1925 5 Sheets-Sheet 3

Inventor
Francis B. Cockburn
By Wood & Wood
Attorneys

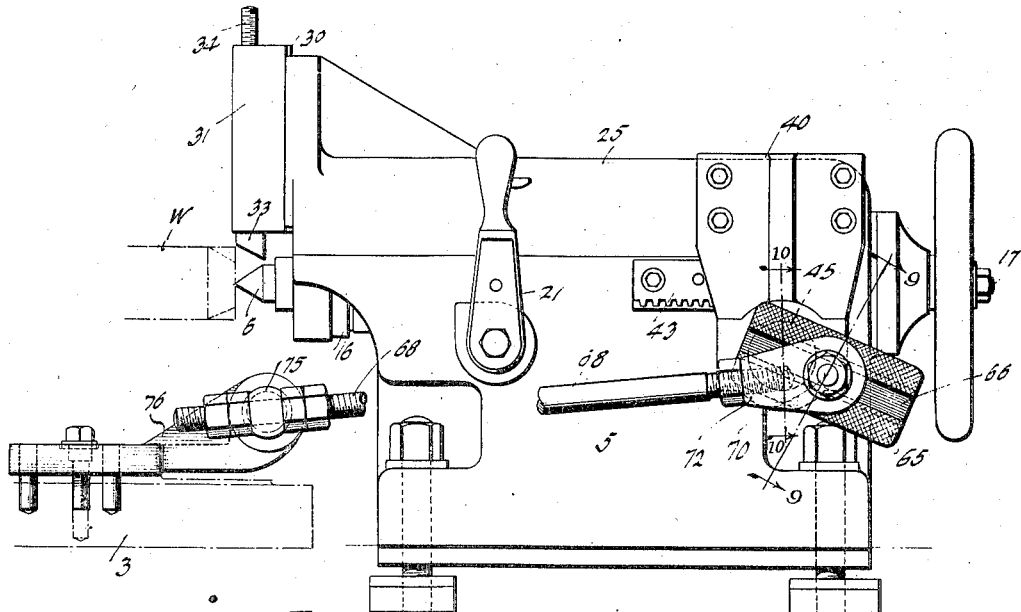
Fig. 7
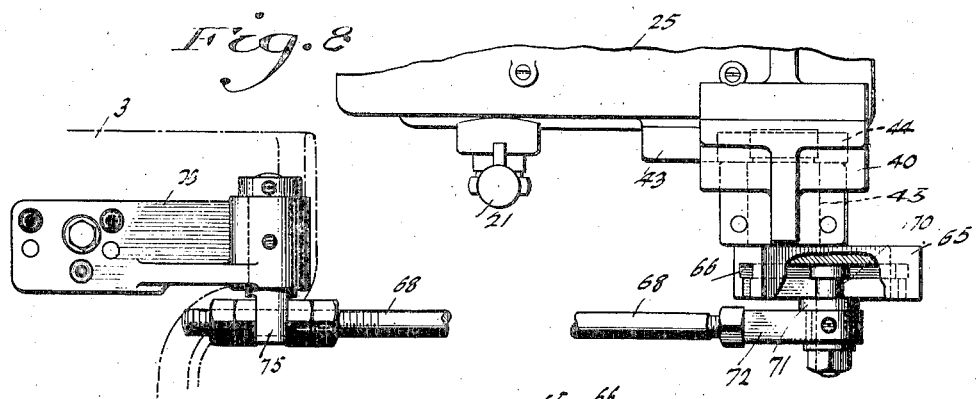
Fig. 8
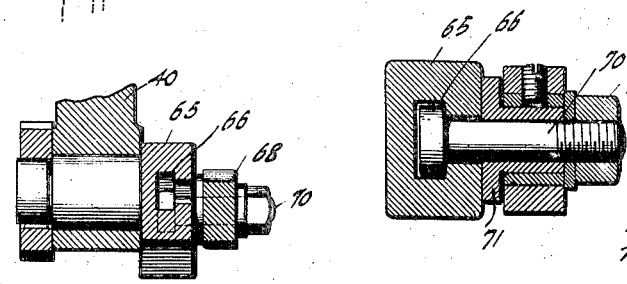
Fig. 9
Fig. 10

Patented Jan. 4, 1927.

1,613,161

UNITED STATES PATENT OFFICE.

FRANCIS B. COCKBURN, OF CINCINNATI, OHIO, ASSIGNOR TO THE LODGE & SHIPLEY MACHINE TOOL COMPANY, OF CINCINNATI, OHIO, A CORPORATION OF OHIO.

TAILSTOCK WITH TOOL SLIDE.

Application filed May 8, 1925. Serial No. 28,937.

This invention relates to improvements in lathes or machines of the type adapted to operate on work carried between centers as head and tail stock, or on arbors requiring a tailstock support.

An object of the invention is to provide the tailstock with a tool carrying slide for supplying the machine with cutting tools additional or auxiliary to the tools mounted upon the carriage, operating either independently thereof or simultaneously therewith upon the work engaged between the machine centers; the slide connecting with the carriage or other moving part of the machine for transmitting the required feed motion to the slide.

Another object of the invention is to connect a tool slide mounted upon a tailstock of a lathe with the lathe carriage for obtaining the slide feed motion, the connection being adjustable for varying the length of feed motion of the slide relative to the movement of the carriage and further for obtaining a definite slide feed motion control; as to permit the carriage to move a definite distance alone or in advance of imparting or transmitting motion to the slide.

Specific features of the invention include the structure and manner of mounting the tool carrying slide for reciprocation parallel with the tailstock centering spindle for operating the tool in a path adjacent the centering end of the spindle.

Other objects and certain advantages will be disclosed in the description of the drawings forming a part of this application and in said drawings:

Figure 7 shows a modification of the connection between the tool slide and carriage.

Figure 8 is a plan view partly in section of the modified connection shown in Fig. 7.

Figure 9 is a section on line 9—9, of Fig. 7.

Figure 10 is a section on line 10—10, of Fig. 7.

The invention is shown applied to a lathe of the automatic type adapted for rapid quantity production wherein the work is held between head and tail stock centers and rotated, with the main carriage operating upon an intermediate portion of the work, and with the tailstock cutting tool operating upon the work adjacent the tailstock end thereof.

The structure or general organization of the lathe or machine tool with which the present improvement is incorporated may be of any of the many commercial types, and as to detail need not be described herein. The carriage has been selected as the moving part of the lathe or machine to which the tailstock tool is connected for obtaining the slide feed motion and the carriage may be translated upon the bed in any approved manner.

Figure 1:
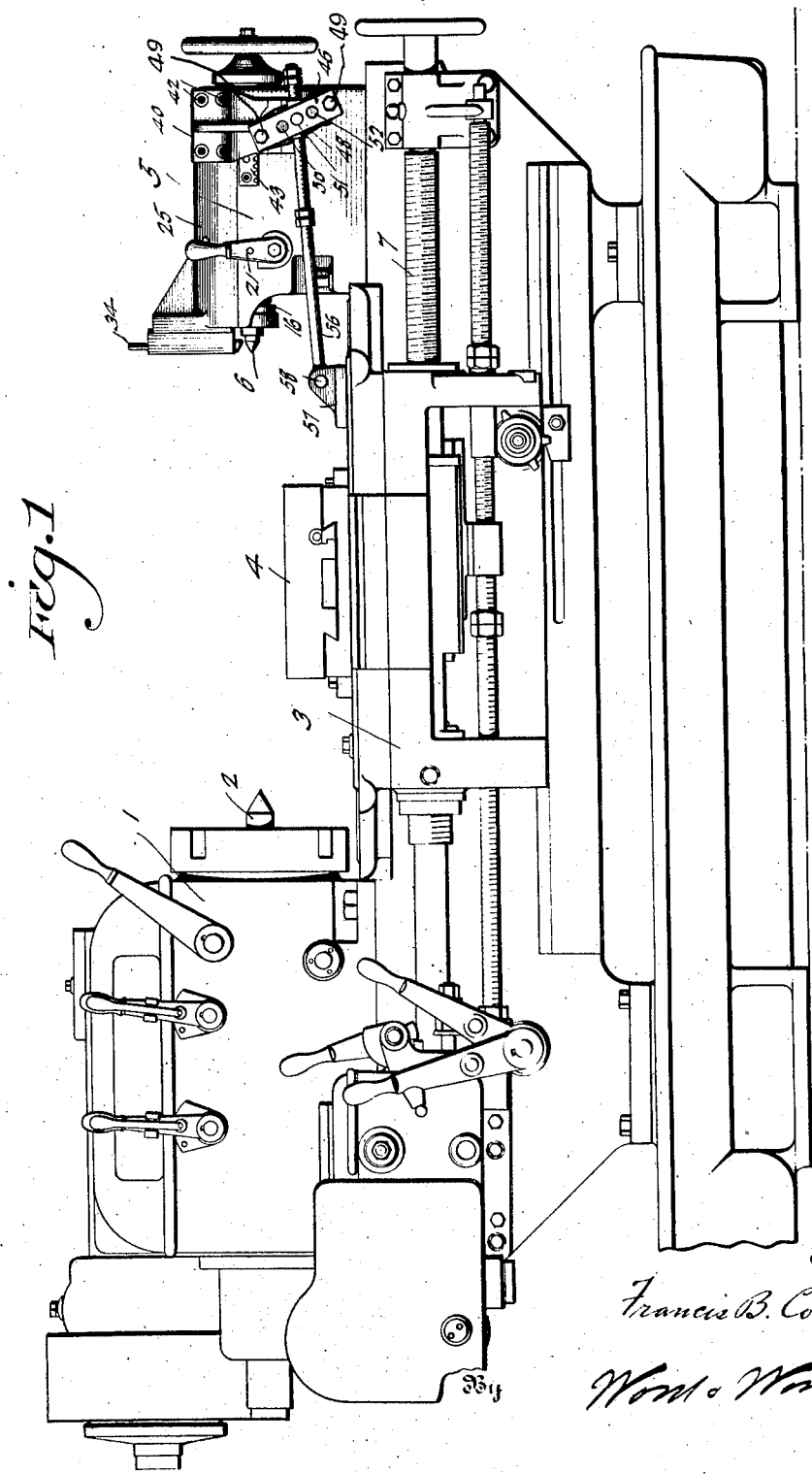
Figure 1 is a side elevation of a lathe of the automatic type, showing my invention applied to the tailstock thereof.
Figure 2:
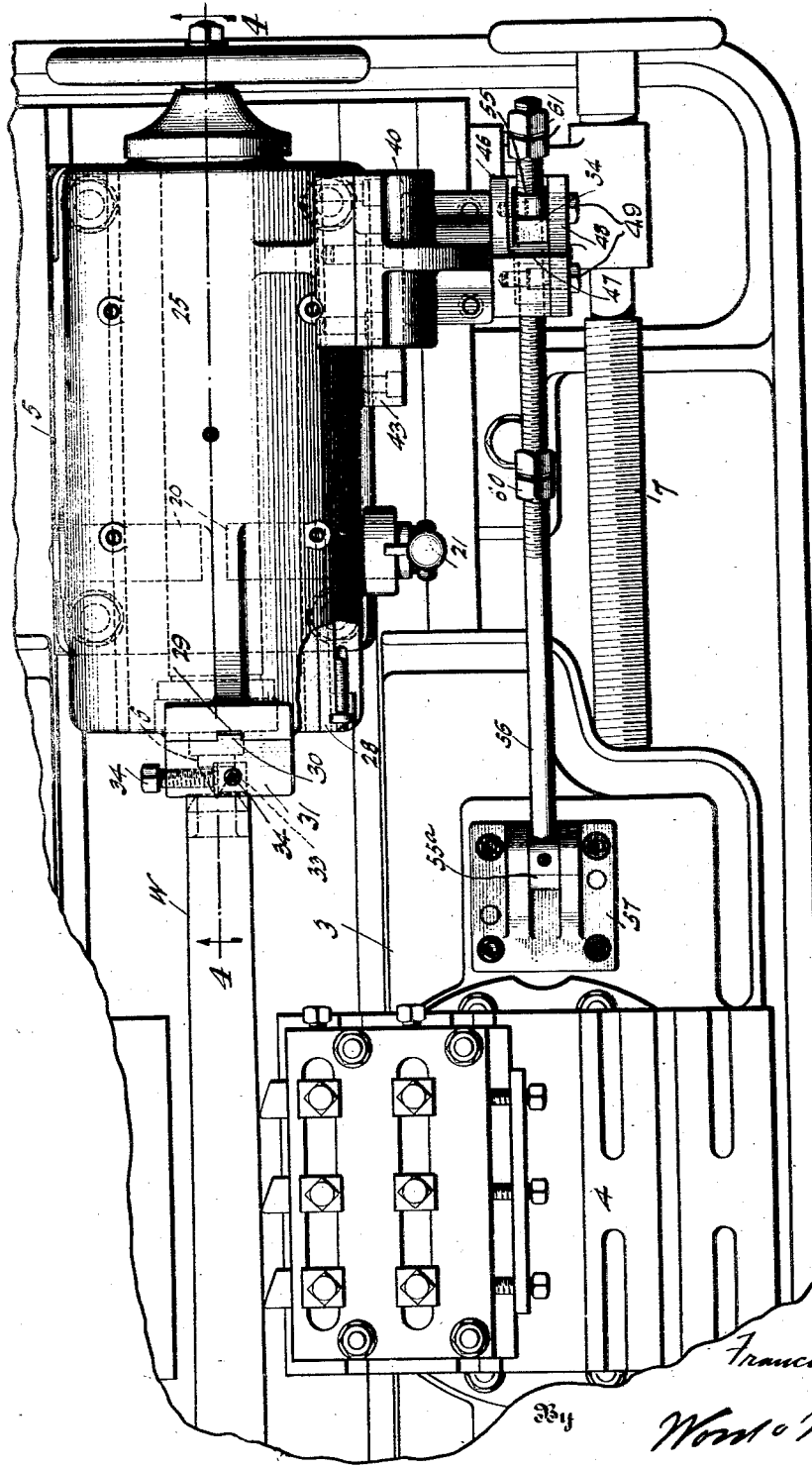
Figure 2 is a fragmentary plan of Figure 1 showing my invention in plan, and illustrating one form of transmission connection between the main carriage and the auxiliary tailstock tool slide reciprocating mechanism.
Figure 3:
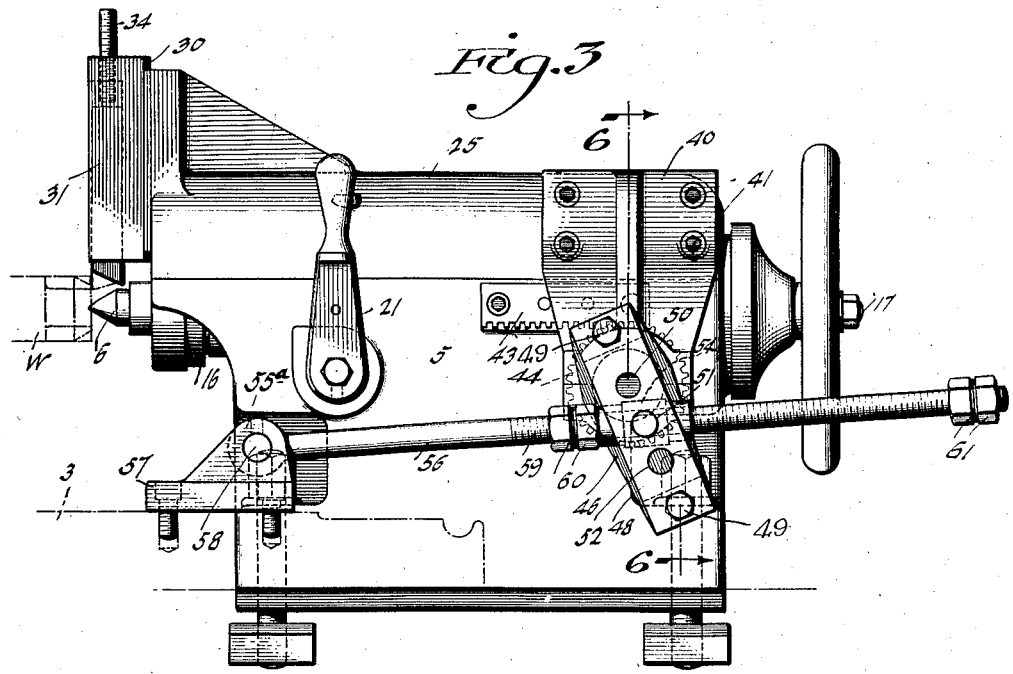
Figure 3 is a side elevation of the improved tailstock.

Referring to the drawings, 1 indicates the headstock within which is journaled the spindle 2. Suitable transmission gearing (not shown) is journaled within the headstock for rotating the spindle and the feed screw 7 journaled at one side of the lathe bed. A carriage 3 is translatably mounted upon rails of the lathe bed and translated by the feed screw through connections carried by the carriage and engaged with the feed screw. The carriage as usual supports a tool slide 4 and tool holder to which one or a plurality of cutting tools are mounted. In Fig. 2 the carriage slide is illustrated with its tool holder or rest provided with a plurality of cutting tools. The carriage is moved or fed upon the lathe bed longitudinally of the feed screw or bed.

A tailstock 5 is mounted upon the lathe bed in the usual manner by clamp plates and bolts adapting the same to be adjustably positioned upon the bed, and is provided with a centering spindle 6.

Figure 4:
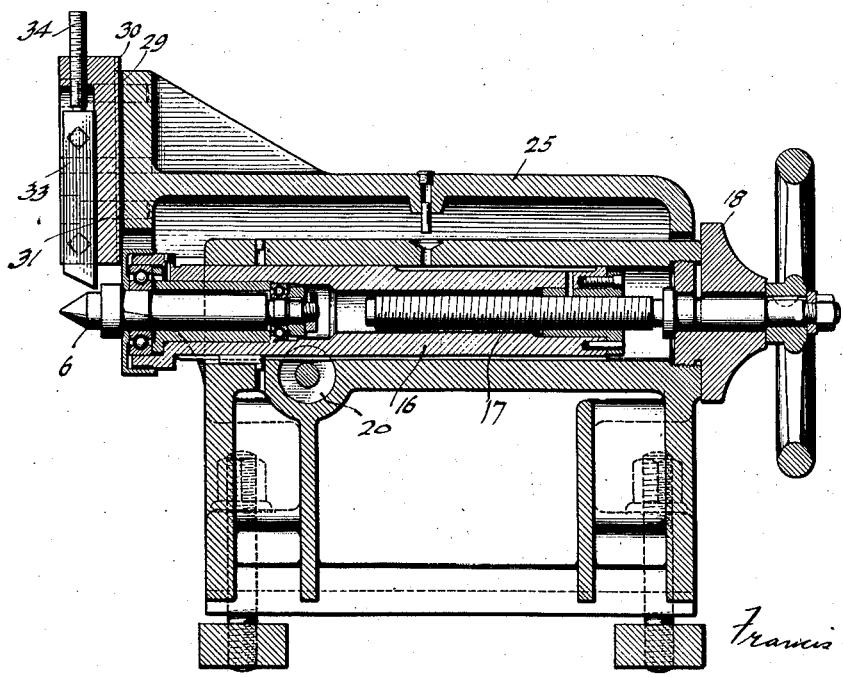
Figure 4 is a vertical longitudinal section on line 4—4, of Figure 2.
Figure 5:
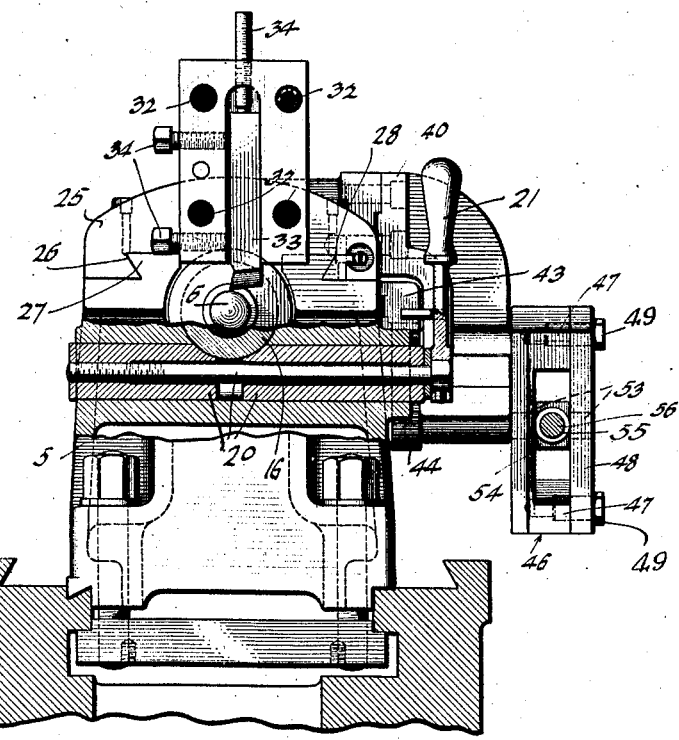
Figure 5 is a sectional elevation taken transversely of the lathe and looking toward the inner side of the tailstock.
Figure 6:
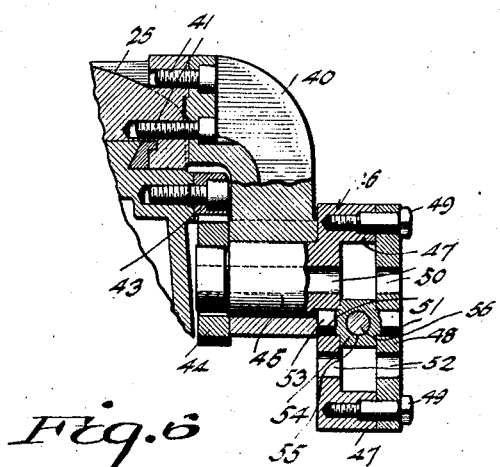
Figure 6 is a detail vertical section on line 6—6, of Fig. 3, illustrating the auxiliary tool slide feed transmission means.

Referring particularly to Figure 4, the centering spindle 6 is rotatably mounted in suitable bearings held in the translatable adjusting slide 16, splined to the tailstock frame and adjustably translatable by the screw 17, rotatable but held against translation in the cap 18. The manually operable clamp for positively holding the slide 16 in adjusted position is generally indicated at 20 (see Fig. 5) and is controlled by the hand lever 21 accessible at the front side of the lathe. The upper portion of the tailstock above the center is machined to provide a dove-tailed slideway 27 for receiving the tool carrying slide 25, which has its lower side grooved as at 26 for engagement with the dove-tail slideway 27. A suitable gib 28 is provided for wear take-up.

The tool slide is vertically grooved at its forward end as at 29, (see Fig. 2) and with this groove is engaged the corresponding guide projection 30 of a tool holder 31, the holder being secured by screws 32. The tool is indicated at 33 and is adjusted and clamped by screws 34, with its cutting end disposed in proper relation to the axis of the tailstock center 6.

To translate the slide 25 upon the tailstock the slide at its rear end is provided with a bracket 40 secured thereto by screws 41. The bracket depends from the slide and overhangs the side of the tailstock body to provide sufficient clearance for a rack plate 43 rigidly fixed to the side of the tailstock body. The rack is engaged by a gear 44 fixed upon the end of a crank shaft 45 journaled in the bracket 40. The opposite end of the crank shaft has a crank arm 46, in Figs. 1 to 6 of box form, to permit a connecting rod to extend therethrough. The arm at opposite ends has laterally extending lugs 47 which are capped by a bridge plate 48 secured to the lugs by screws 49.

The arm and bridge plate are provided with a series of openings in aligned pairs, 50, 51 and 52 for respectively receiving the axially aligned trunnions 53 of the swivel block 54 having an opening or bore 55 therethrough through which the connecting rod 56 is extended. The swivel block pivotally connects the rod 56 to the crank arm. The swivel block may be set in any one of the pairs of openings 50, 51 and 52 for adjustably positioning the block for changing the crank arm throw relative to a definite degree of carriage travel, the connecting rod at one end being pivotally connected to the carriage 3.

In one form of my invention the inner end of the link has an eye 55ª pivotally held by a pin 58 between ears of the draw bar or bracket 57, suitably attached by screws to the top surface of the main carriage. (See Fig. 2.)

The bar is threaded as at 59, and has pairs of nuts 60, 61 engaged with the threads, a pair at each side of the swivel block 54, whereby the nuts as stops may be adjusted for abuttingly engaging the swivel block to throw the oscillating crank in opposite directions, either intermittently or regularly, for synchronizing the feed of the auxiliary slide with that of the carriage, and for changing the connecting reach with the relative setting adjustment of carriage and tailstock.

In Figures 7 to 10, inclusive, is shown a modified form of feed stroke or throw adjusting means, by which a finer range of adjustment of the swivel block can be had, and wherein instead of using a limited step by step radial adjustment of the swivel block from one pair of aligned journal openings to another, I provide a sliding adjustment. For this purpose the crank or arm 65 has a T-shaped slot 66, the slot running lengthwise thereof radially of the axis of rotation of the crank. In this slot I place a complemental adjusting pivot device to which the adjustable connecting link 68 is pivotally attached.

Referring to Figure 9 a modified pivoting means comprises a headed bolt 70 having its head within the T-slot and having its shank extending outwardly therefrom and terminally threaded. A flanged sleeve 71 is placed over the projecting end of the screw with its flange engaged flatly against the face of the crank arm, and the eye or bore of the end 72 of the linearly adjustable connecting link 68 is then placed over this sleeve and a retaining washer and nut 73 applied, thus, pivotally and radially adjustably attaching the link to the crank.

In this form of the invention the opposite end of the link passes slidably through an opening in the outer end of a pivot shaft 75, rotatably non-translatably held in horizontal position in a bracket 76 also attached to the top of the carriage. Pairs of adjustable abutments are provided as in the first form of the invention and the compensatory adjustment between the auxiliary slide operating crank and the carriage is obtained substantially as in the first form of the invention.

The essential feature of both forms is that the link pivotally connects with both tool carrying and crank members and is adjustable lengthwise between the two, slidably in one and radially relative to the crank, to permit intermediate movements of the carriage without corresponding movements of the crank member and for varying the stroke of the crank member, and for permitting independent adjustments of tool carrying and crank members during preliminary setting of the machine. With the crank arm swinging at the lower side of a horizontal line through the axis the tailstock slide will travel in an opposite direction to that of the carriage, and when adjusted to swing upon an upper side the tailstock slide will be fed in a direction corresponding with the direction of carriage travel.

The connection between the carriage and tailstock slide is appropriately set for a given piece of work for obtaining the proper amount of feed and direction of travel of the cutting tool carried by the slide, within a determined period of carriage travel. This additional cutting tool whenever utilized may thus operate upon the work either in conjunction with the cutting tools mounted upon the carriage or independent thereof. When the carriage travel for machining a given piece of work is very extended and that required for the tailstock cutting very limited, the nuts 60, 61 on the connecting rods are set to permit the rod to freely slide through one of its end connections for a determined degree of carriage travel before imparting motion to the crank arm 65. The range of adjustment is very apparent to any operator so that it will not be necessary to herein make any further description thereof.

Having described my invention, I claim:

1. In combination with a lathe including a head stock, tail stock, carriage and feed screw for operating the carriage, a tool slide reciprocable upon the tail stock, gear elements transmittably connecting the slide and tail stock for obtaining feed movements of the slide, a crank for oscillating one of the elements, and a rigid link connecting said crank and carriage adjustable for permitting fractional movements of the carriage independently of crank movements.

2. In combination with a lathe including a head stock, tail stock, carriage and feed screw for operating the carriage, a tool slide reciprocable upon the tail stock, gear elements transmittably connecting the slide and tail stock for obtaining feed movements of the slide, a crank for oscillating one of the elements, a rigid link connecting the crank and carriage adjustable for permitting fractional movements of the carriage independently of crank movements, and for varying the length of crank stroke for changing the ratio of slide travel to crank movement.

3. In combination with a lathe including a head stock, a tail stock, each having centering spindles, a tool carriage operable longitudinally between the centering spindles, an auxiliary tool slide translatable upon the tail stock, means upon the tail stock connected with the slide for obtaining feed motions of the same, and means connecting the tool slide feeding means with the carriage adjustable for varying the length of auxiliary slide feed relative to distance of carriage travel, and for permitting fractional movement of the carriage independently of the feeding means to obtain intermittent movements of said feeding means.

4. In combination with a lathe, a tail stock, a tool carriage, a head stock, a tool slide translatable upon the tail stock, gear elements transmittably connecting tail stock and slide for feeding the slide, means connecting the tool slide feeding means with the carriage adjustable for varying feed movements of the gear elements and for permitting partial movements of the carriage without corresponding movements of the tool slide feeding means.

5. A lathe including a tail stock, a head stock and carriage, an auxiliary tool slide translatably mounted upon the tail stock for movement parallel with a centering spindle gear means for transmitting feed motions, said auxiliary tool slide including a crank, rigid link means connecting said carriage and crank adjustable with respect to both, for changing the length of the crank stroke and for permitting independent movements of the carriage between translation limits for obtaining intermittent feed actions of the crank alternately at or near translation limits of the carriage.

6. In combination with a lathe including a head stock, a tail stock and tool carriage translatable therebetween, a tool slide reciprocable upon the tail stock, a crank operable rack and gear means upon the tail stock for obtaining feed motions of the tool slide, and a link pivotally connected to both carriage and crank and radially adjustable relative to the rotative axis of the crank.

7. In combination with a lathe including a head stock, a tail stock, a main carriage translatable therebetween, a tool slide reciprocable upon the tail stock, crank operable rack and gear means upon the tail stock for transmitting feed motion to said tool slide, and a link pivotally connected to both crank and carriage and slidable relative to one of the same, said link having stops adjustable for limiting the degree of sliding motion of the link in either or both directions.

8. In combination with a lathe, including a head stock, a tail stock, a carriage adapted to be fed longitudinally between the head stock and tail stock, an auxiliary tail slide reciprocable upon the tail stock, gearing for obtaining feed motions of the slide, a crank for oscillating one of the gearing elements, a link connected pivotally at opposite ends respectively with the carriage and crank, and adjustable longitudinally of the carriage and crank and radially of the axis of rotation of the crank.

In witness whereof, I hereunto subscribe my name.

FRANCIS B. COCKBURN.